(12) United States Patent
Kim et al.

(10) Patent No.: US 8,976,305 B2
(45) Date of Patent: Mar. 10, 2015

(54) DISPLAY APPARATUS AND METHOD OF MANUFACTURING THE SAME

(75) Inventors: Sungryul Kim, Asan-si (KR); Daecheol Kim, Hwaseong-si (KR); Woongkwon Kim, Cheonan-si (KR); Ki-Hun Jeong, Cheonan-si (KR); Sungjin Mun, Seoul (KR); Jung suk Bang, Guri-si (KR); Byeonghoon Cho, Seoul (KR); Kun-Wook Han, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 420 days.

(21) Appl. No.: 13/351,820

(22) Filed: Jan. 17, 2012

(65) Prior Publication Data

US 2012/0113344 A1     May 10, 2012

(30) Foreign Application Priority Data

Aug. 22, 2011    (KR) .................. 10-2011-0083603

(51) Int. Cl.
| | |
|---|---|
| G02F 1/1368 | (2006.01) |
| G02F 1/1333 | (2006.01) |
| G02F 1/1362 | (2006.01) |
| G06F 3/042 | (2006.01) |
| G02F 1/1337 | (2006.01) |
| G02F 1/1343 | (2006.01) |

(52) U.S. Cl.
CPC ...... *G02F 1/13338* (2013.01); *G02F 1/136209* (2013.01); *G02F 1/13624* (2013.01); *G06F 3/0421* (2013.01); *G02F 1/133707* (2013.01); *G02F 2001/134345* (2013.01); *G02F 2201/083* (2013.01); *G06F 2203/04103* (2013.01)
USPC ........................................................... 349/12

(58) Field of Classification Search
None
See application file for complete search history.

(56) References Cited

U.S. PATENT DOCUMENTS

| | | | |
|---|---|---|---|
| 4,904,056 A | 2/1990 | Castleberry | |
| 7,128,459 B2* | 10/2006 | Igarashi et al. | 362/621 |
| 2007/0097278 A1* | 5/2007 | Rho et al. | 349/12 |
| 2009/0231497 A1* | 9/2009 | Takahashi et al. | 349/1 |
| 2011/0050645 A1* | 3/2011 | Lee et al. | 345/175 |

FOREIGN PATENT DOCUMENTS

| | | |
|---|---|---|
| JP | 3704889 B2 | 10/2005 |
| JP | 4043002 B2 | 2/2008 |
| KR | 100205519 B1 | 4/1999 |

* cited by examiner

*Primary Examiner* — Thanh-Nhan P Nguyen
(74) *Attorney, Agent, or Firm* — Cantor Colburn LLP (57) ABSTRACT

A display apparatus includes a light generating part and a display panel. The display panel includes a first substrate, and a second substrate facing the first substrate. The second substrate includes a plurality of pixel units including a sensor sensing the light generated from the light generating part and reflected from an object disposed on the display panel, and a pixel. The display panel further includes a light blocking member which is positioned at a position corresponding to an area in which the sensor is disposed and prevents the light generated from the light generating part from being directly incident to the sensor. The light blocking member is disposed on the first substrate.

21 Claims, 12 Drawing Sheets

DISPLAY APPARATUS AND METHOD OF MANUFACTURING THE SAME

This application claims priority to Korean Patent Application No. 10-2011-0083603 filed on Aug. 22, 2011, and all the benefits accruing therefrom under 35 U.S.C. §119, the contents of which are herein incorporated by reference in its entirety.

BACKGROUND OF THE INVENTION

1. Field of Invention

The invention relates to a display apparatus and a method of manufacturing the same. More particularly, the invention relates to a display apparatus having a touch sensor installed therein and a method of manufacturing the display apparatus.

2. Description of the Related Art

In general, a touch panel allows a user to select contents displayed on an image display apparatus using a finger or a stylus. The image display apparatus employing the touch panel detects a position touched by the user through the touch panel and carries out an operation corresponding to the contents of the touch position.

The touch panel is employed for a liquid crystal display. In this case, the touch panel is disposed on a liquid crystal display panel, on which an image is displayed, to detect position information corresponding to the input from the user. However, when the touch panel is separately prepared from the liquid crystal display panel and then attached to the liquid crystal display panel, optical properties of the liquid crystal display, such as brightness, viewing angle, etc., are deteriorated and the thickness of the liquid crystal display increases by the thickness of the touch panel.

BRIEF SUMMARY OF THE INVENTION

Exemplary embodiments of the invention provide a display apparatus having an improved productivity.

Exemplary embodiments of the invention provide a method of manufacturing the display apparatus.

According to the exemplary embodiments, a display apparatus includes a display panel receiving a light to display an image, and at least one light generating part providing the light to the display panel.

The display panel includes a first substrate and a second substrate. The second substrate faces the first substrate. The second substrate includes a plurality of pixel units including a sensor sensing the light generated from the light generating part and reflected from an object disposed on the display panel, and a pixel. In addition, the display panel includes a light blocking member positioned at a position corresponding to an area in which the sensor is disposed to prevent the light generated from the light generating part from being directly incident to the sensor.

According to the exemplary embodiments, a method of manufacturing a display apparatus is provided as follows. A second substrate is formed to include a second base substrate in which a plurality of pixel unit areas including a pixel area and a sensor area is formed. Then, a first substrate is formed to include a first base substrate and a common electrode, and a liquid crystal layer is interposed between the first substrate and the second substrate. Next, a pixel and a sensor are respectively formed in the pixel area and the sensor area in each of the pixel unit areas, and a light blocking member is formed to correspond to the sensor area.

According to the above, since the sensor and the pixel are disposed on one substrate and the switching transistor and first to third transistors, which are arranged in the same row, are connected to one gate line, a manufacturing process for the display apparatus may be simplified. Thus, a manufacturing process time for the display apparatus may be reduced, thereby improving productivity of the display apparatus.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Hereinafter, the invention will be explained in detail with reference to the accompanying drawings.

Figure 1:
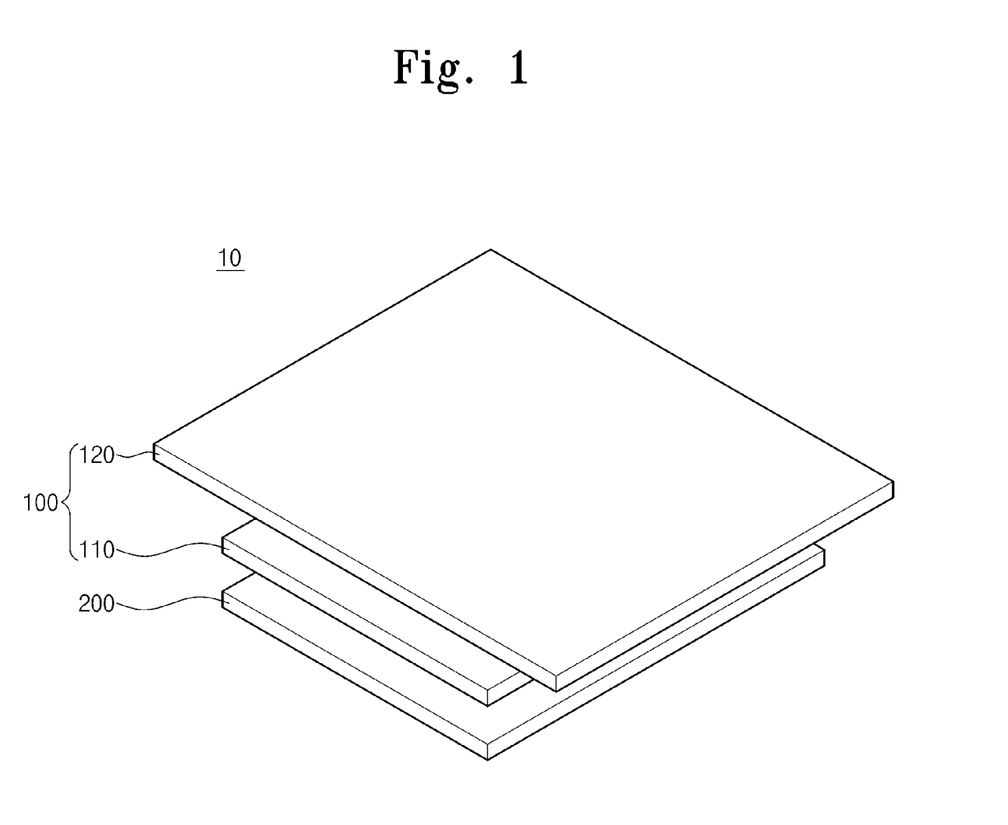
FIG. 1 is an exploded perspective view showing an exemplary embodiment of a display apparatus according to the invention.
Figure 2:
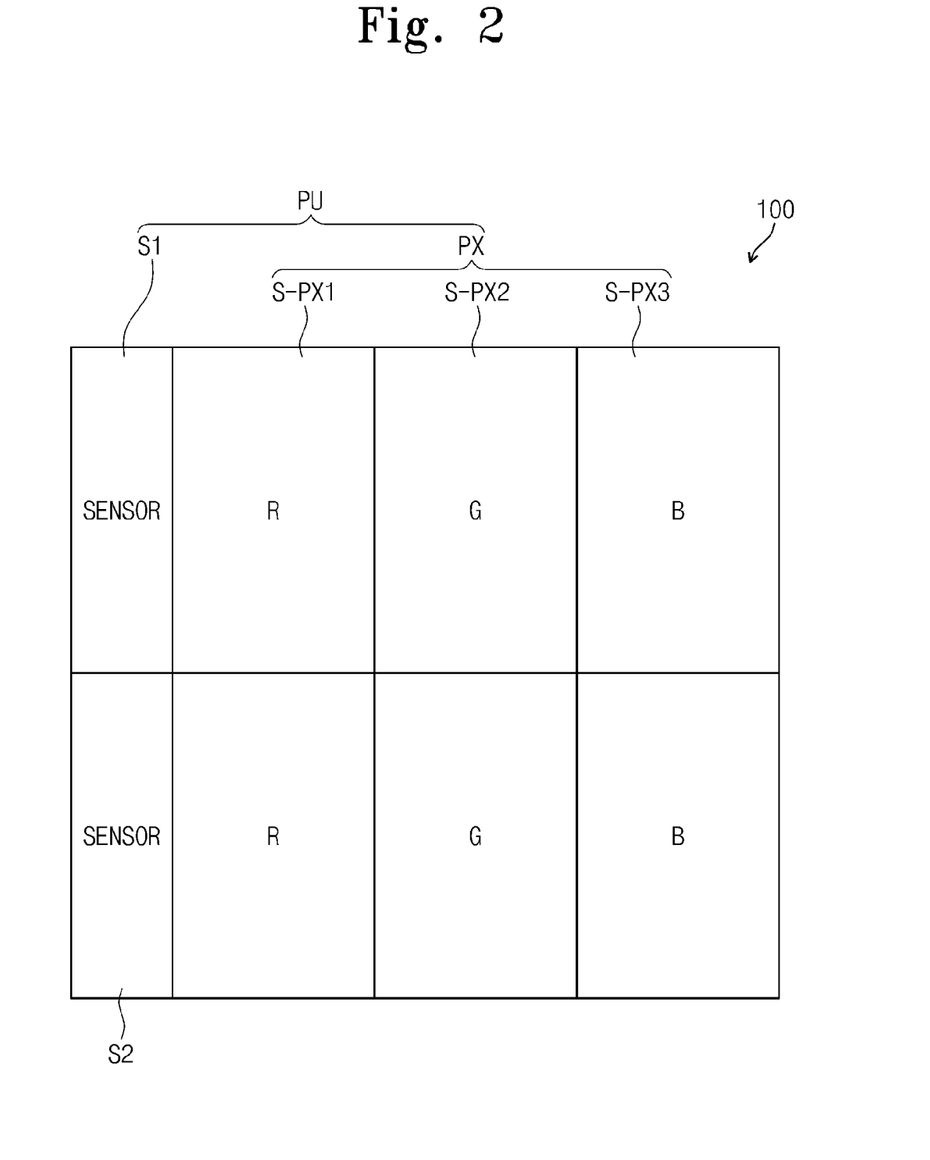
FIG. 2 is a plan view showing an exemplary embodiment of a portion of a display panel shown in FIG. 1.

FIG. 1 is an exploded perspective view showing an exemplary embodiment of a display apparatus according to the invention and FIG. 2 is a plan view showing a portion of a display panel shown in FIG. 1.

Referring to FIGS. 1 and 2, a display apparatus 10 includes a display panel 100 displaying an image and a backlight unit 200 providing a light to the display panel 100 as a light generating part.

The backlight unit 200 is disposed under the display panel 100 and includes first light sources emitting white lights and second light sources emitting infrared rays. The first light sources may be alternately arranged with the second light sources, and each of the first and second light sources may be a light emitting diode.

The display panel 100 includes a first substrate 110, a second substrate 120 facing the first substrate 110, and a liquid crystal layer (not shown) interposed between the first substrate 110 and the second substrate 120. The second substrate 120 includes a plurality of pixel units PU. Each of the pixel units PU includes a sensor that detects the light emitted from the backlight unit 200 and reflected from an object disposed on the display panel 100 to output a sensing signal, and a pixel PX that displays the image.

The pixel units PU may be arranged in a matrix form. In addition, the pixel PX may include a plurality of sub-pixels S-PX1, S-PX2, and S-PX3 arranged in a predetermined (e.g., first) direction to display different colors from each other. In the exemplary embodiment of FIG. 2, for instance, the pixel PX may include first, second, and third sub-pixels S-PX1, S-PX2, and S-PX3 to display three different colors from each other and the first, second, and third sub-pixels S-PX1, S-PX2, and S-PX3 may display a red color, a green color, and a blue color, respectively. The display panel 100 may display one color using the pixel PX including the first, second, and third sub-pixels S-PX1, S-PX2, and S-PX3.

The sensor is disposed adjacent to one side of the pixel PX. In FIG. 2, the sensor is disposed adjacent to a left side of the pixel PX, but it should not be limited thereto or thereby. That is, the sensor may be disposed adjacent to a right side of the pixel PX.

The sensor senses whether an object exists on the display panel 100 or not. In one exemplary embodiment, as an example, the sensor may be a photosensor that measures an amount of the light incident thereto to sense the existence of the object.

When a sensor included in one pixel unit PU of the pixel units PU is referred to as a first sensor S1, a sensor included in a pixel unit PU adjacent to the one pixel unit PU in a (e.g., second) direction substantially perpendicular to the (e.g., first) direction in which the first, second, and third sub-pixels S-PX1, S-PX2, and S-PX3 are arranged may be referred to as a second sensor S2. The first sensor S1 and the second sensor S2 may sense different lights from each other. In one exemplary embodiment, for instance, the first sensor S1 senses the white light and the second sensor S2 senses the infrared ray. In addition, the first sensor S1 and the second sensor S2 are alternately arranged with each other in the second direction. That is, the first sensor S1 is arranged in an even-numbered pixel row and the second sensor S2 is arranged in an odd-numbered pixel row.

Figure 3:
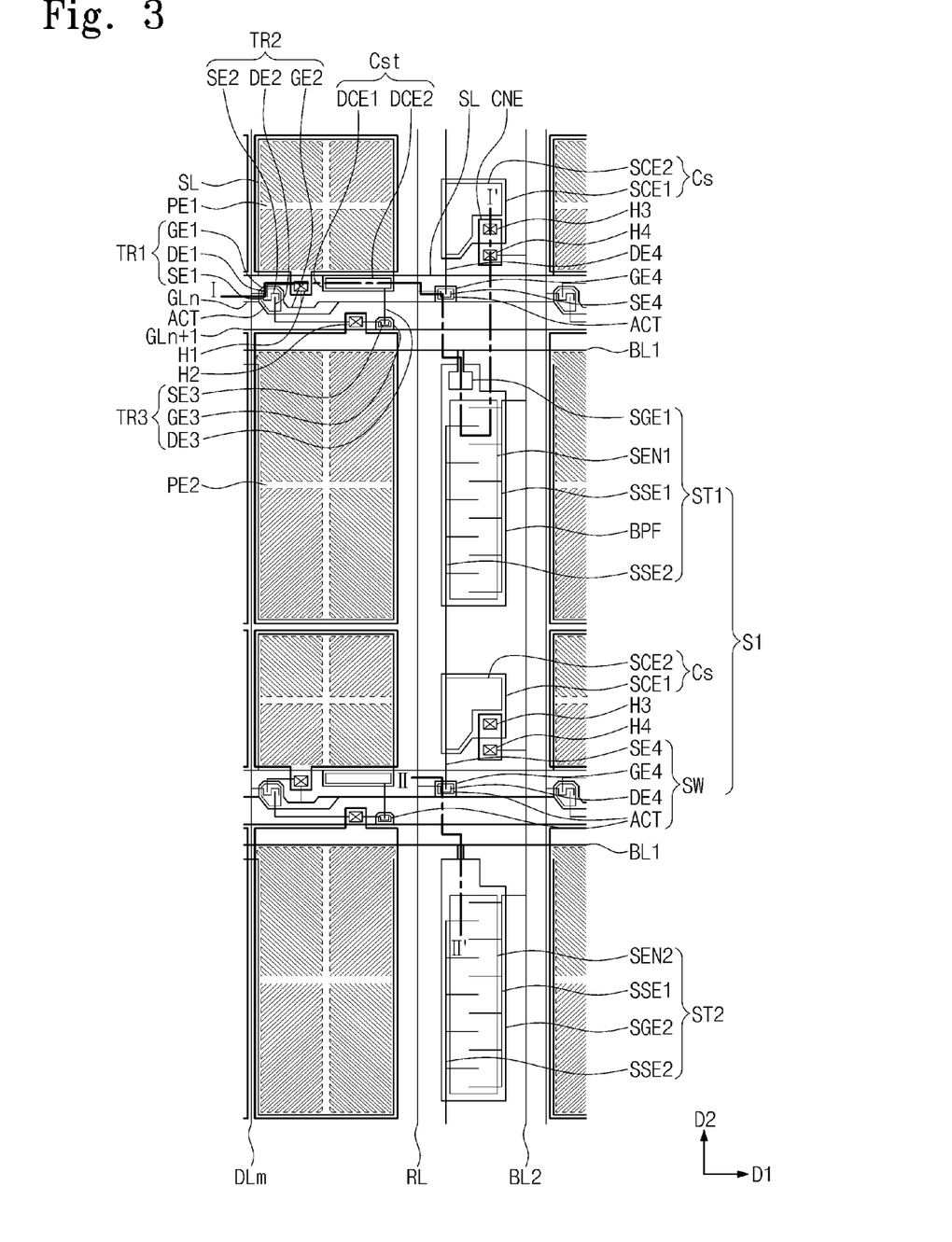
FIG. 3 is a plan view showing an exemplary embodiment of pixels and sensors shown in FIG. 2.
Figure 4:
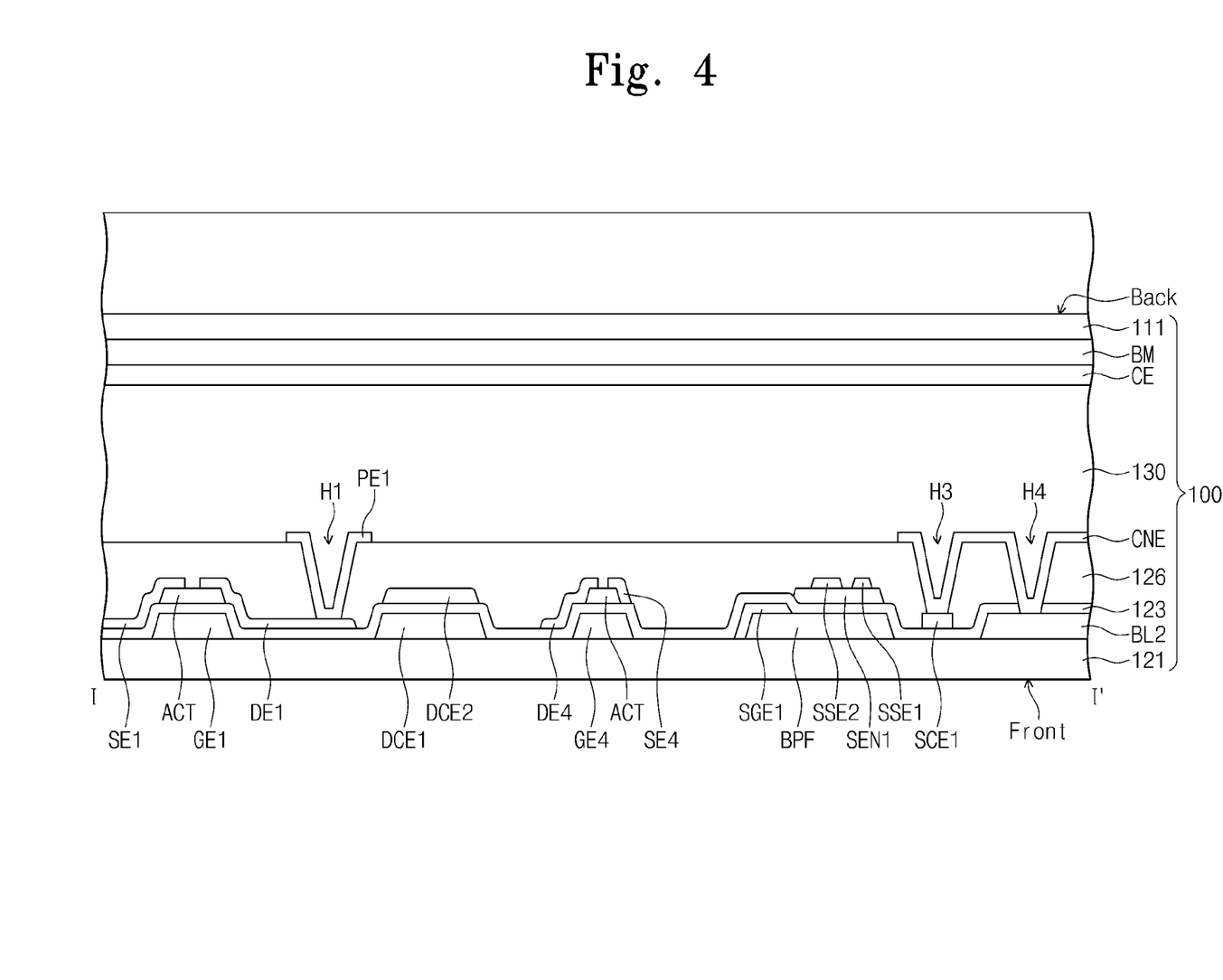
FIG. 4 is a cross-sectional view taken along line I-I' shown in FIG. 3.
Figure 5:
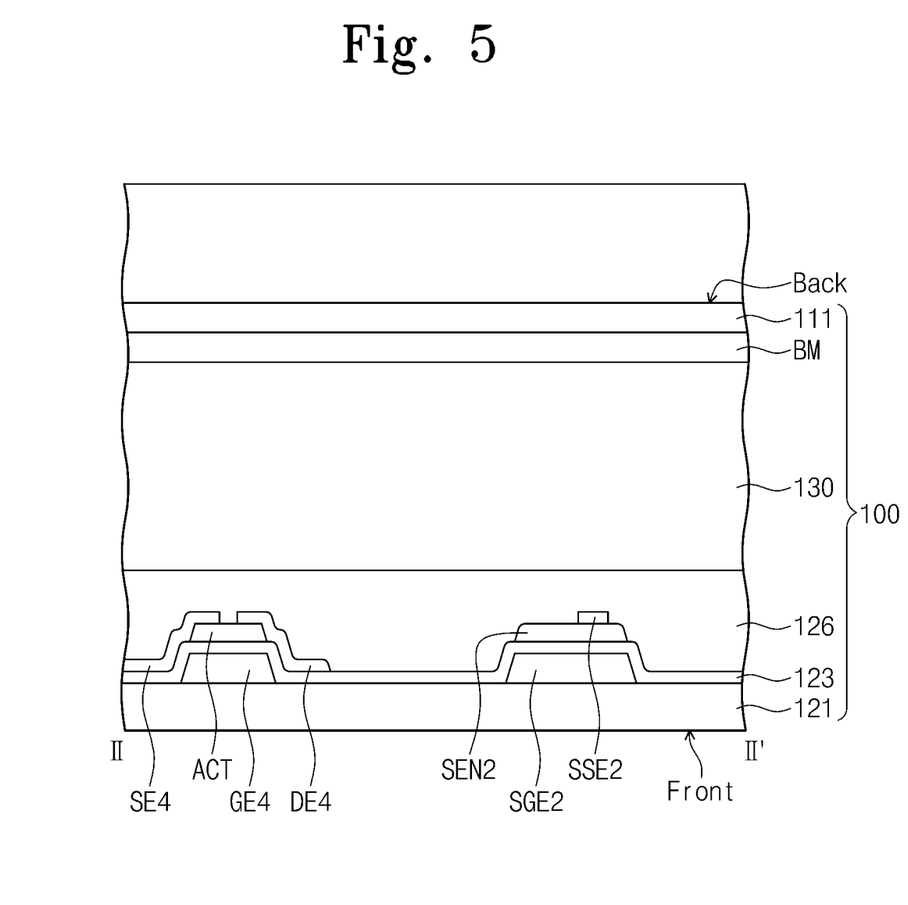
FIG. 5 is a cross-sectional view taken along line II-II' shown in FIG. 3.

FIG. 3 is a plan view showing an exemplary embodiment of pixels and sensors shown in FIG. 2, FIG. 4 is a cross-sectional view taken along line I-I' shown in FIG. 3, and FIG. 5 is a cross-sectional view taken along line II-II' shown in FIG. 3.

In detail, FIG. 3 shows the pixels PX and sensors when viewed from a rear side of the first substrate 110. The second substrate 120 includes a second base substrate 121, a plurality of gate lines, a plurality of data lines, a plurality of first bias lines, a plurality of second bias line, a plurality of readout lines, the pixels PX, and the sensors.

The gate lines are extended in a first direction D1 and sequentially receive a gate signal. The data lines and the readout lines are extended in a second direction D2 crossing the first direction D1 and insulated from the gate lines. The data lines receive a data voltage. The pixels PX may further include storage lines SL to which a storage voltage is applied. The storage lines SL may be disposed on the same layer as the gate lines.

In the illustrated exemplary embodiment, since the pixels PX have the same structure and function, one pixel PX will be described as a representative example and details of others will be omitted.

The pixel PX includes a first transistor TR1, a second transistor TR2, and a third transistor TR3, a first pixel electrode PE1, a second pixel electrode PE2, a first distribution electrode DCE1, and a second distribution electrode DCE2. In the illustrated exemplary embodiment, the first and second transistors TR1 and TR2 are disposed adjacent to each other and on one gate electrode GE1,GE2.

The first and second transistors TR1 and TR2 output the data voltage in response to the gate signal provided through an n-th gate line GLn.

The first transistor TR1 includes a first gate electrode GE1, a first source electrode SE1, and a first drain electrode DE1. The first gate electrode GE1 is branched from the n-th gate line GLn (n is a natural number equal to or larger than 1). A first insulating layer 123 is on the first gate electrode GE1, and a semiconductor layer ACT is on the first insulating layer 123. The first source electrode SE1 branched from an m-th data line DLm (m is a natural number equal to or larger than 1) and the first drain electrode DE1 spaced apart from the first source electrode SE1 are on the semiconductor layer ACT.

The second transistor TR2 includes a second gate electrode GE2, a second source electrode SE2, and a second drain electrode DE2. Similar to the first transistor TR1, the second source electrode SE2 branched from the m-th data line DLm and the second drain electrode DE2 spaced apart from the second source electrode SE2 are on the semiconductor layer ACT.

The third transistor TR3 outputs the data voltage provided through the second drain electrode DE2 in response to the gate signal provided from an (n+1)-th gate line GLn+1. The third transistor TR3 includes a third gate electrode GE3 branched from the (n+1)-th gate line GLn+1, a third source electrode SE3 connected to the second drain electrode DE2, and a third drain electrode DE3 spaced apart from the source electrode SE3 in a predetermined distance. Although not shown in figures, the first insulating layer 123 is on the third gate electrode GE3 and the semiconductor layer ACT is on the first insulating layer 123. In addition, the third source electrode SE3 and the third drain electrode DE3 are on the semiconductor layer ACT.

The second distribution electrode DCE2 is electrically connected to the third drain electrode DE3. The second distribution electrode DCE2 may be disposed on the same layer as the third drain electrode DE3 and integrally formed with the third drain electrode DE3, such that the second distribution electrode CDE2 and the third drain electrode DE3 collectively form a single, unitary, indivisible member.

The first distribution electrode DCE1 is extended from the first storage line SL1 to face the second distribution electrode DCE2. The first distribution electrode DCE1 and the second distribution electrode DCE2 form a distribution capacitor.

The second substrate 120 further includes a second insulating layer 126 on the second base substrate 121 to cover the first to third source electrodes SE1, SE2, and SE3, the first to third drain electrodes DE1, DE2, and DE3, and the second distribution electrode DCE2. The second insulating layer 126 includes silicon nitride (SiNx) or silicon oxide ($SiO_2$).

The first pixel electrode PE1 and the second electrode PE2 are disposed on the second insulating layer 126 and spaced apart from each other while interposing the first and second transistors TR1 and TR2 therebetween. Each of the first and second pixel electrodes PE1 and PE2 has a rectangular shape.

In detail, the first pixel electrode PE1 includes a cross-shape trunk portion having a horizontal trunk portion and a vertical trunk portion, an outer portion disposed at ends of the first pixel electrode PE1, and a protrusion portion protruded from a left side lower end of the outer portion and connected to the first drain electrode DE1 through a first contact hole H1 which extends through a thickness of the second insulating layer 126. The first storage line SL1 is extended in the first and second directions D1 and D2 to surround the first pixel electrode PE1, thereby preventing a light leakage.

The second pixel electrode PE2 includes a cross-shape trunk portion having a horizontal trunk portion and a vertical trunk portion, an upper horizontal portion, a lower horizontal portion, and a protrusion portion protruded from the vertical trunk portion and connected to the second drain electrode DE2 through a second contact hole H2 which extends through the thickness of the second insulating layer 126.

Each of the first pixel electrode PE1 and the second pixel electrode PE2 is divided into four sub-areas by the cross-shaped trunk portion and each sub-area includes a plurality of branch portions outwardly extended from the cross-shaped trunk portion and inclined to the gate line GL. The angle between the gate line GL and the branch portions is from about 45 degrees to about 135 degrees.

Sides of the branch portions of the first and second pixel electrodes PE1 and PE2 distort an electric field of the liquid crystal layer to cause horizontal components of the electric field vertical to the sides of the branch portions, and an inclination direction of liquid crystal molecules in the liquid crystal layer depends on the horizontal components of the electric field. Accordingly, the liquid crystal molecules tend to be inclined toward a direction vertical to the sides of the branch portions. However, since the direction of the horizontal components of the electric field is opposite to that of the horizontal components of the electric field caused by adjacent branch portions and a width of the branch portions or a distance between the branch portions is narrower than a cell gap of the liquid crystal layer 130, the liquid crystal molecules are inclined in a direction substantially parallel to a longitudinal direction of the branch portions.

As described above, since each of the first and second pixel electrodes PE1 and PE2 includes the four sub-areas in which the branch portions have different longitudinal directions from each other, the liquid crystal molecules in liquid crystal layer 130 are inclined in four directions. As a result, a viewing angle of a liquid crystal display may be improved.

The second substrate 120 further includes a plurality of sensors. Referring to FIG. 2, for instance, the sensors of the second substrate 120 include a first sensor S1 sensing an infrared ray and a second sensor S2 sensing a white light. When a sensor included in one pixel unit PU of the pixel units PU is referred to as a first sensor S1, a sensor included in a pixel unit PU adjacent to the one pixel unit PU in a direction substantially perpendicular to the direction in which the first, second, and third sub-pixels S-PX1, S-PX2, and S-PX3 are arranged may be referred to as a second sensor S2. In addition, the first sensor S1 is arranged in an odd-numbered pixel row and the second sensor S2 is arranged in an even-numbered pixel row.

In the illustrated exemplary embodiment, since the first sensors S1 have the same structure and function, one first sensor S1 will be described as a representative example and details of other first sensors will be omitted. In addition, the second sensors S2 have the same structure and function, one second sensor S2 will be described as a representative example and details of other second sensors will be omitted.

The first sensor S1 includes a switching transistor SW, a first sensor transistor ST1, and a charging capacitor Cs. The first sensor S1 further includes a first gate line GL1, a first readout lint RL, a first bias line BL1, and a second bias line BL2. The first gate line GL1 is connected to the first and second transistors TR1 and TR2.

The first bias line BL1 transmits a first bias voltage. The first bias line BL1 is extended in the first direction D1 and disposed on the same layer as the first gate line GL1.

The second bias line BL2 transmits a second bias voltage different the first bias voltage. A first readout line RL is connected to the switching transistor SW to receive a sensing signal output from the switching transistor SW. The first readout line RL and the second bias line BL2 are extended in the second direction D2 and substantially parallel to a first data line DL1. In addition, the first readout line RL and the second bias line BL2 may be disposed on the same layer as the first data line DL1.

The first sensor transistor ST1 senses the infrared ray and outputs the sensing signal according to the sensed light amount. The first sensor transistor ST1 includes a first sensing electrode SSE1, a second sensing electrode SSE2, a first sensor layer SEN1, and a first sensor gate electrode SGE1.

The first sensor gate electrode SGE1 is connected to the first bias line BL1. The first sensor gate electrode SGE1 is disposed on the same layer as the first gate electrode GE1 of the first transistor TR1.

A filter BPF is disposed between the first sensor gate electrode SGE1 and the second base substrate 121 to transmit the light having the infrared ray wavelength and block the light having another wavelength. The filter BPF may include silicon germanium (SiGe). The filter BPF receives the first bias voltage from the first sensor gate electrode SGE1 and the first bias voltage has a negative polarity.

The first sensor gate electrode SGE1 and the filter BPF are covered by the first insulating layer 123 and the first sensor layer SEN1 is disposed on the filter BPF. The first sensor layer SEN1 may include silicon germanium (SiGe) as the filter BPF.

The first sensing electrode SSE1 is disposed on the first sensor layer SEN1. The first sensing electrode SSE1 is connected to the second bias line BL2. The second bias voltage has a level different from that of the first bias voltage. The second bias line BL2 is disposed on the same layer as the first sensing electrode SSE1.

The first sensing electrode SSE1 includes a plurality of first branch electrodes extended in the first direction D1, and a connection portion extended in the second direction D2 to connect the first branch electrodes to each other. The second sensing electrode SSE2 is disposed on the first sensor layer SEN1 and spaced apart from the first sensing electrode SSE1. The second sensing electrode SSE2 includes a plurality of second branch electrodes extended in the first direction D1, and a connection portion connecting the second branch electrodes to each other. The first branch electrodes are alternately arranged with the second branch electrodes.

The first sensing electrode SSE1 and the second sensing electrode SSE2 are disposed on the same layer as the first source electrode SE1 of the first transistor TR1.

The charging capacitor Cs includes a first charging electrode SCE1 and a second charging electrode SCE2. The first charging electrode SCE1 is disposed on the same layer as the first sensor gate electrode SGE1. The first insulating layer 123 covers the first charging electrode SCE1 and includes a third contact hole H3 to expose a portion of the first charging electrode SCE1.

The second charging electrode SCE2 is disposed on the first charging electrode SCE1. The second charging electrode SCE2 is connected to the first drain electrode DE1 and disposed on the same layer as the first drain electrode DE1. The second charging electrode SCE2 is insulated from the first charging electrode SCE1 by the first insulating layer 123. The first charging electrode SCE1 and the second charging electrode SCE2 form the charging capacitor Cs.

The second insulating layer 126 covers the second charging electrode SCE2, the first source electrode SE1, the first drain electrode DE1, and the second bias line BL2. The second insulating layer 126 includes a fourth contact hole H4 to expose a portion of the second bias line BL2, and the third contact hole H3 corresponding to a third contact hole H3 extending through the first insulating layer 123 to expose the portion of the first charging electrode SCE1. The first charging electrode SCE1 and the second bias line BL2 are connected to each other by a connection electrode CNE disposed on the second insulating layer 126 through the third and fourth contact holes H3 and H4. The first charging electrode SCE1 receives the second bias voltage from the second bias line BL2 through the connection electrode CNE.

The switching transistor SW outputs the sensing signal in response to the gate signal. The switching transistor SW includes a fourth gate electrode GE4, a fourth source electrode SE4, and a fourth drain electrode DE4.

The fourth gate electrode GE4 is branched from the first gate line GL1. The fourth gate electrode GE4 is disposed on the same layer as the first, second, and third gate electrodes GE1, GE2, and GE3 of the first, second, and third transistors TR1, TR2, and TR3. The fourth gate electrode GE4 is covered by the first insulating layer 123 and the semiconductor layer ACT is disposed on the fourth gate electrode GE4.

The fourth source electrode SE4 is disposed on the semiconductor layer ACT. The fourth source electrode SE4 is connected to the second sensing electrode SSE2 and the second charging electrode SCE2 to output the sensing signal.

The fourth drain electrode DE4 is spaced apart from the fourth source electrode SE4. The fourth source electrode SE4 and the fourth drain electrode DE4 are disposed on the same layer as the first source electrode SE1. In addition, the fourth drain electrode DE4 is connected to the first readout line RL and applies the sensing signal to the first readout line RL.

The second sensor S2 includes the switching transistor SW, a second sensor transistor ST2, and the charging capacitor Cs. The second sensor S2 further includes the first gate line GL1, the first readout line RL, the first bias line BL1, and the second bias line BL2. In the illustrated exemplary embodiment, the switching transistor SW and the charging capacitor Cs of the second sensor S2 have the same structure and function as those of the switching transistor SW and the charging capacitor Cs of the first sensor S1, and thus details thereof will be omitted and assigned the same numerals.

The second sensor transistor ST2 senses the white light and outputs the sensing signal. The second sensor transistor ST2 includes a first sensing electrode SSE1, a second sensing electrode SSE2, a second sensor layer SEN2, and a second sensor gate electrode SGE2.

The second sensor gate electrode SGE2 is connected to the first bias line BL1. The first sensor gate electrode SGE1 is disposed on the same layer as the first gate electrode GE1 of the first transistor TR1.

The second sensor gate electrode SGE2 is covered by the first insulating layer 123 and the second sensor layer SEN2 is disposed on the second sensor gate electrode SGE2. The second sensor layer SEN2 may include amorphous silicon a-Si. The second sensor layer SEN2 may be activated by the white light incident thereto.

The first sensing electrode SSE1 of the second sensor transistor ST2 is disposed on the second sensor layer SEN2. The first sensing electrode SSE1 is connected to the second bias line BL2. The first sensing electrode SSE1 includes a plurality of first branch electrodes extended in the first direction D1 and a connection portion extended in the second direction D2 to connect the first branch electrodes. The second sensing electrode SSE2 is spaced apart from the first sensing electrode SSE1 and disposed on the second sensor layer SEN2. The second sensing electrode SSE2 includes a plurality of second branch electrodes extended in the first direction D1 and a connection portion connecting the second branch electrodes. The first branch electrodes are alternately arranged with the second branch electrodes in the second direction D2. The first sensing electrode SSE1 and the second sensing electrode SSE2 are disposed on the same layer as the first source electrode SE1 of the first transistor TR1.

The second insulating layer 126 covers the second charging electrode SCE2 of the charging capacitor Cs, the first source electrode SE1, the first drain electrode DE1, and the second bias line BL2. The second insulating layer 126 includes the fourth contact hole H4 to expose the portion of the second bias line BL2, and the third contact hole H3 corresponding to the third contact hole H3 extended through a thickness the first insulating layer 123 to expose the portion of the first charging electrode SCE1. The first charging electrode SCE1 and the second bias line BL2 are connected to each other by the connection electrode CNE disposed on the second insulating layer 126 through the third and fourth contact holes H3 and H4. The first charging electrode SCE1 receives the second bias voltage from the second bias line BL2 through the connection electrode CNE.

In the illustrated exemplary embodiment, the display panel includes the first sensors S1 alternately arranged with the second sensors S2, but they should not be limited thereto or thereby. That is, the display panel may include only the first sensors S1 or only the second sensors S2.

The first substrate 110 includes a first base substrate 111 facing the second base substrate 121, and a color filter (not shown), a light blocking member BM, and a common electrode CE disposed on the first base substrate 111.

The color filter is disposed on the first base substrate 111 to correspond to (e.g., overlap) the first pixel electrode PE1 and the second pixel electrode PE2. The color filter has one of red, green and blue colors.

The light blocking matrix BM is disposed in areas in which the first and second sensors S1 and S2 are disposed. The light blocking member BM prevents the light from the backlight unit 200 from being incident to the first and second sensors S1 and S2. In the illustrated exemplary embodiment, the light blocking member BM includes a material having a light transmittance of about 5%. This is to prevent the first and second sensors S1 and S2 from being malfunctioned by an external light transmitting through the light blocking member BM.

The common electrode CE includes a transparent material, such as indium tin oxide ("ITO"), indium zinc oxide ("IZO"), etc., and is disposed over the first base substrate 111. The common electrode CE faces the first pixel electrode PE1 and a second pixel electrode PE2 while interposing the liquid crystal layer 130 therebetween. Thus, the common electrode CE and the first pixel electrode PE1 form a first liquid crystal capacitor, and the common electrode CE and the second pixel electrode PE2 form a second liquid crystal capacitor.

In the illustrated exemplary embodiment, the color filter and the light blocking member BM are disposed on the first substrate 110, but the color filter and the light blocking member BM may be disposed on the second substrate 120 according to alternative embodiments.

FIGS. 6A to 6G are plan views showing an exemplary embodiment of a method of manufacturing a display apparatus according to the invention.

Figure 6A:
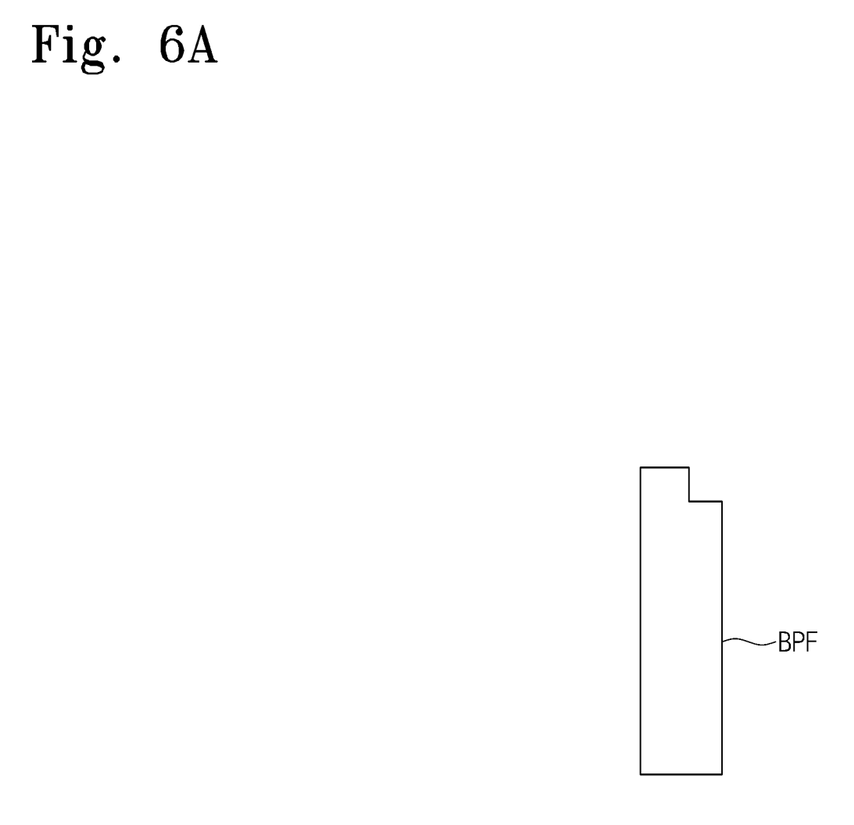
FIGS. 6A to 6G are plan views showing an exemplary embodiment of a method of manufacturing a display apparatus according to the invention.

Referring to FIG. 6A, a silicon germanium layer is formed on the second base substrate 121. The silicon germanium layer may be formed by a chemical vapor deposition process. The silicon germanium layer is patterned by an etch process to form the filter BPF. The silicon germanium layer reacts with the light to have conductivity.

Figure 6B:
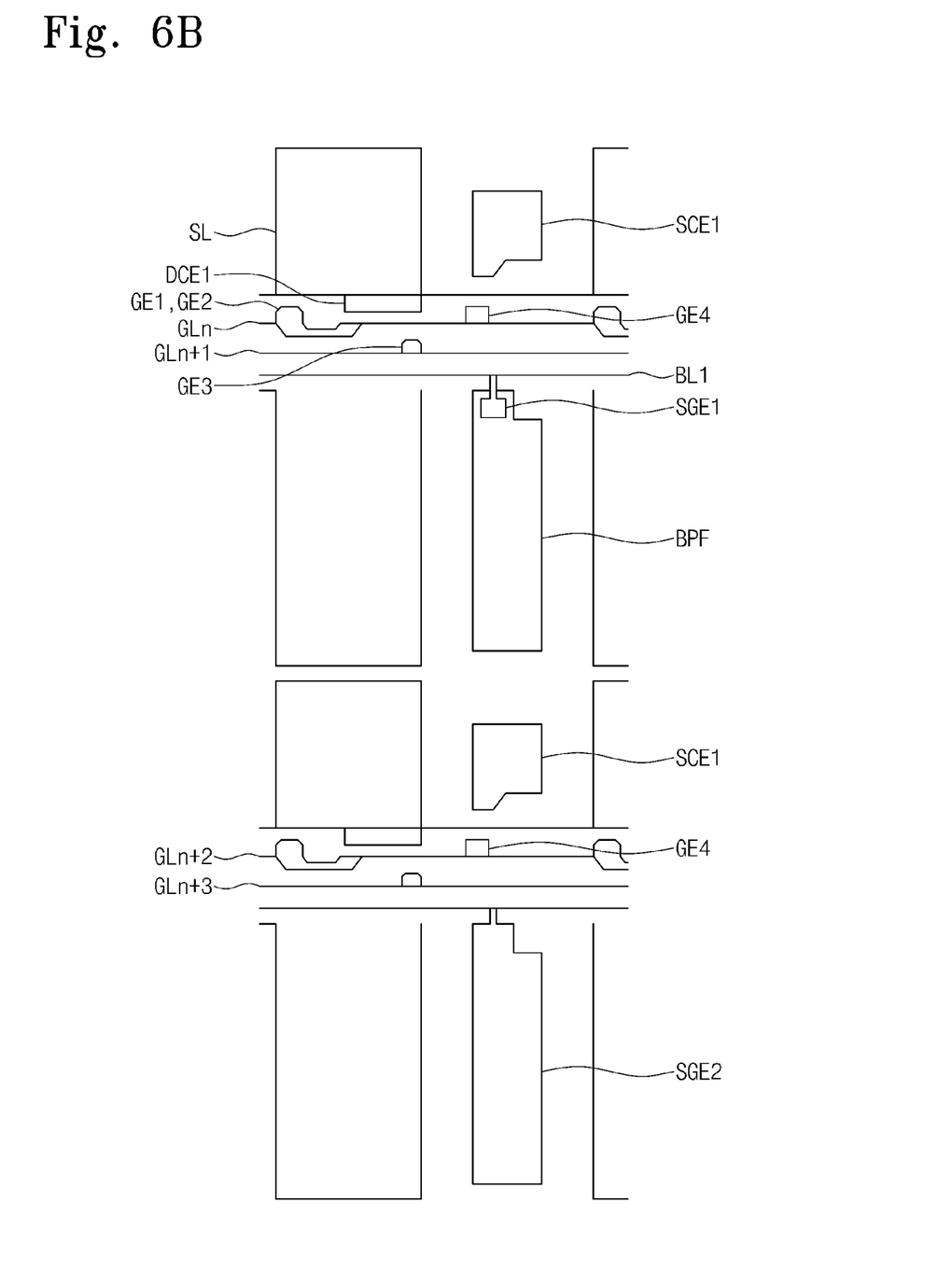

Referring to FIG. 6B, a gate metal is formed on the second base substrate 121 by a sputtering process. The gate metal has a single-layer structure of chromium, aluminum, molybdenum, or copper, or a multi-layer structure of metals.

Then, the gate metal is patterned to form the first, third, and fourth gate electrodes GE1, GE3, and GE4, the first and second sensor gate electrodes SGE1 and SGE2, the storage line SL, the gate lines GL, the first bias line BL1, the first distribution electrode DCE1, and the first charging electrode SCE1. The first sensor gate electrode SGE1 is formed on (e.g., overlapping) the filter BPF.

The first insulating layer 123 is formed on the second base substrate 121 to cover the first, third, and fourth gate electrodes GE1, GE3, and GE4, the first and second sensor gate electrodes SGE1 and SGE2, the storage line SL, the gate lines GL, the first bias line BL1, the first distribution electrode DCE1, the first charging electrode SCE1, and the filter BPF.

Figure 6C:
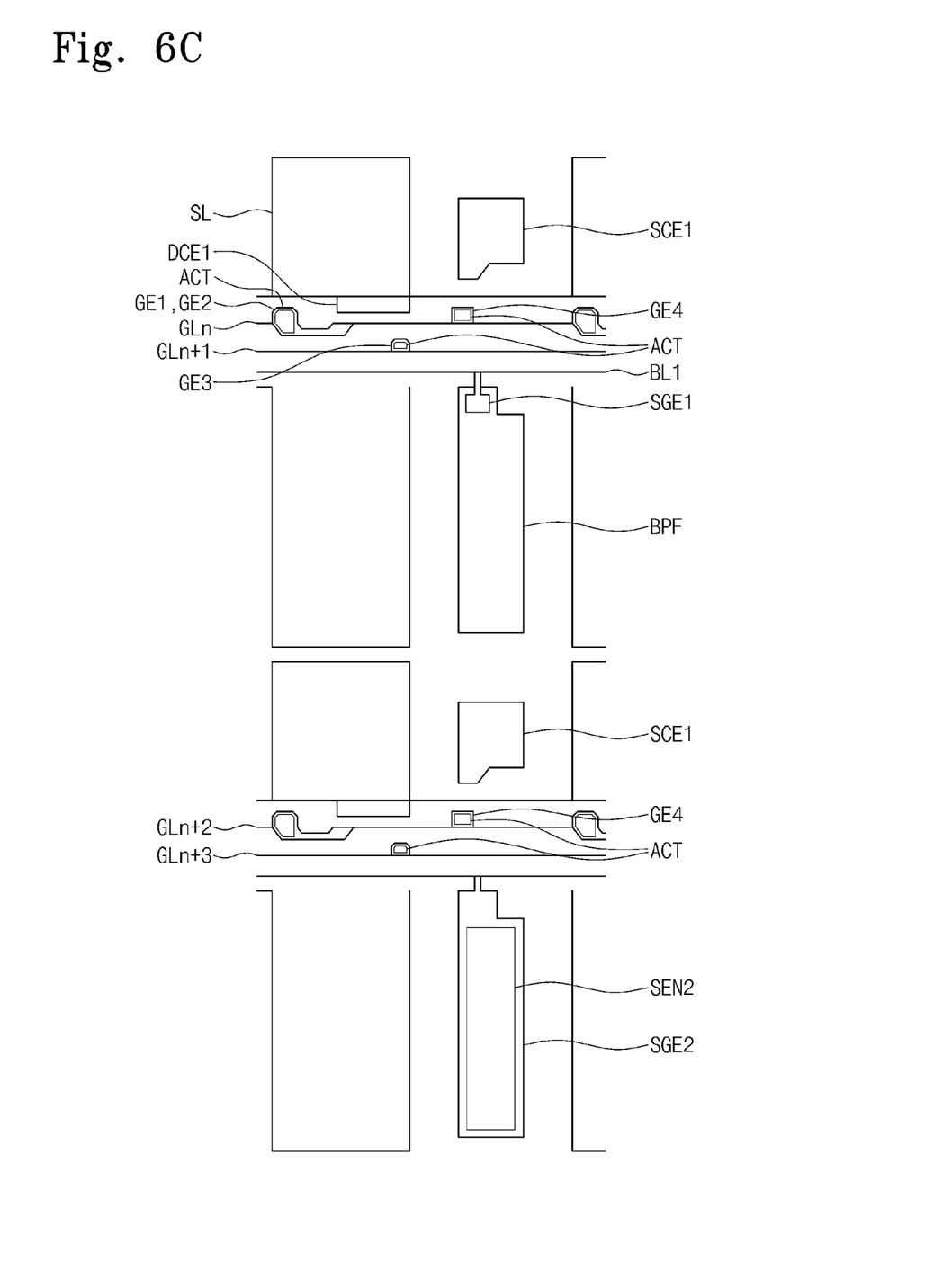

As shown in FIG. 6C, the semiconductor layer ACT is formed on the first insulating layer 123 to correspond to (e.g., overlap) the first, third, and fourth gate electrodes GE1, GE3, and GE4, and the second sensor layer SEN2 is formed on the second sensor gate electrode SGE2. The second sensor layer SEN2 and the semiconductor layer ACT may be formed of the amorphous silicon.

Figure 6D:
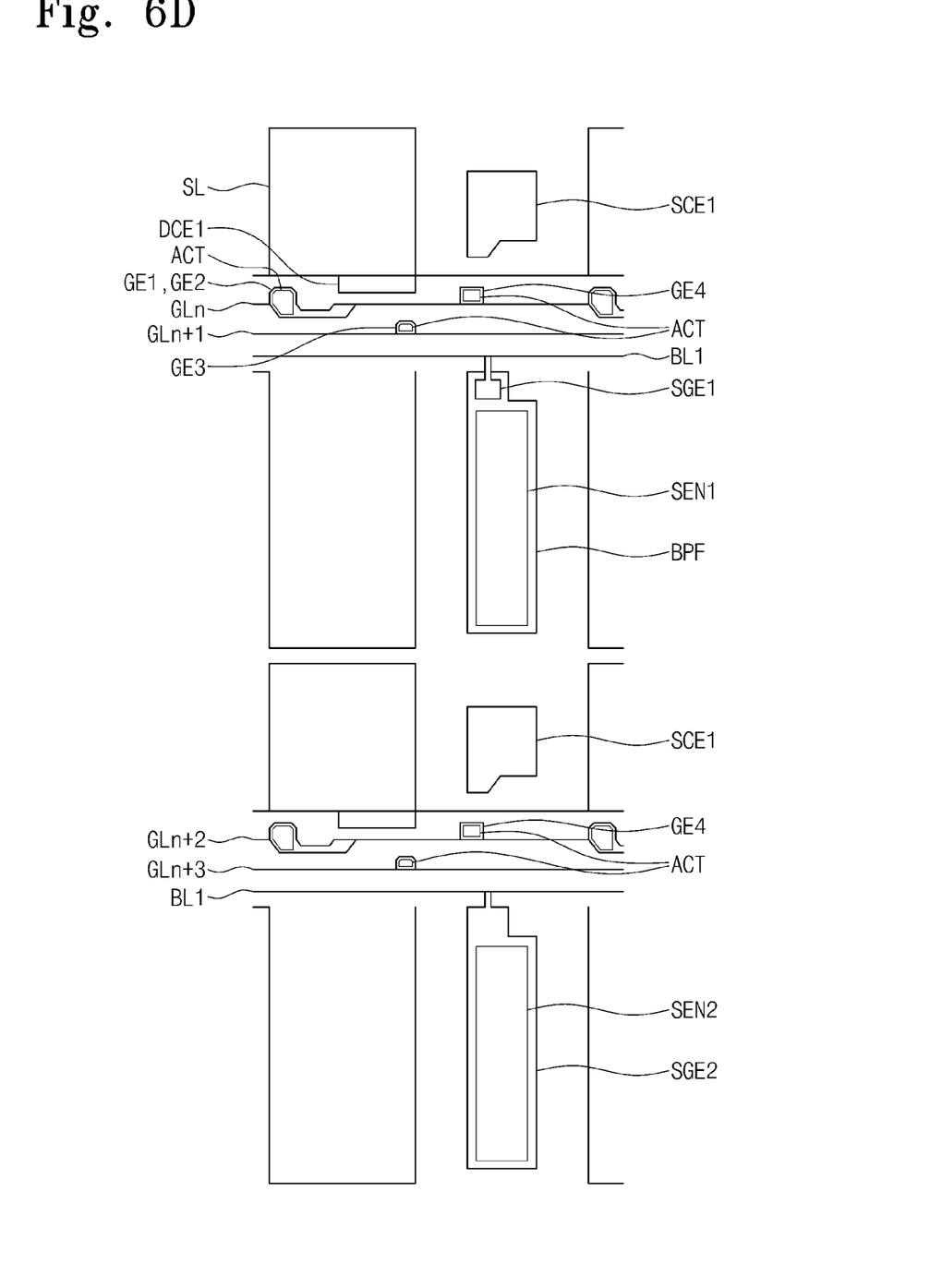

Referring to FIG. 6D, the first sensor layer SEN1 is formed on the first insulating layer 123 to correspond to the filter BPF. The first sensor layer SEN1 may be formed of a silicon germanium.

Figure 6E:
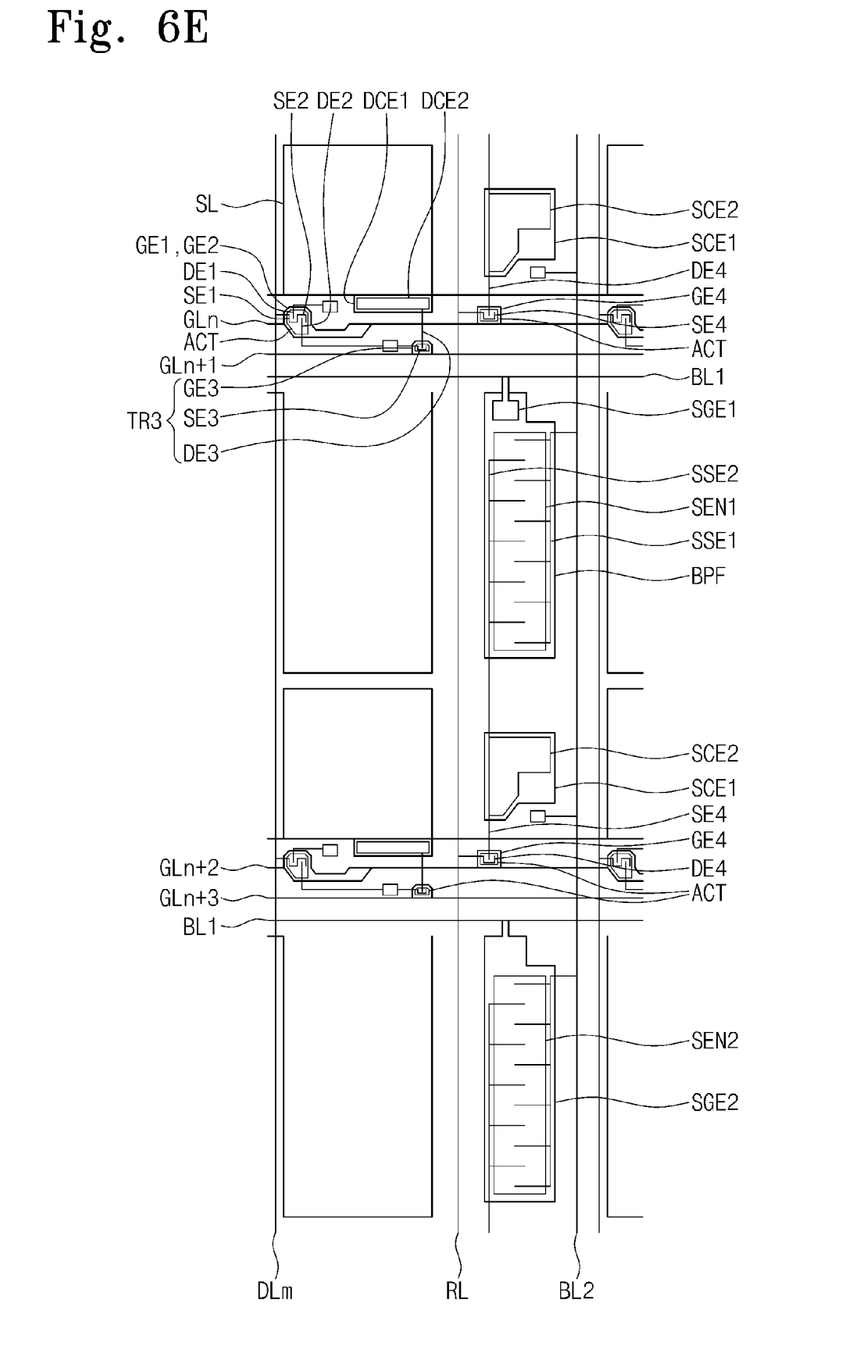

Referring to FIG. 6E, a data metal is formed on the second base substrate 121 and then patterned to form the data lines DL, the second bias line BL2, the second distribution electrode DCE2, the second charging electrode SCE2, the first sensing electrode SSE1, the second sensing electrode SSE2, the readout lines RL, the first, second, third, and fourth source electrodes SE1, SE2, SE3, and SE4, and the first, second, third, and fourth drain electrodes DE1, DE2, DE3, and DE4.

Figure 6F:
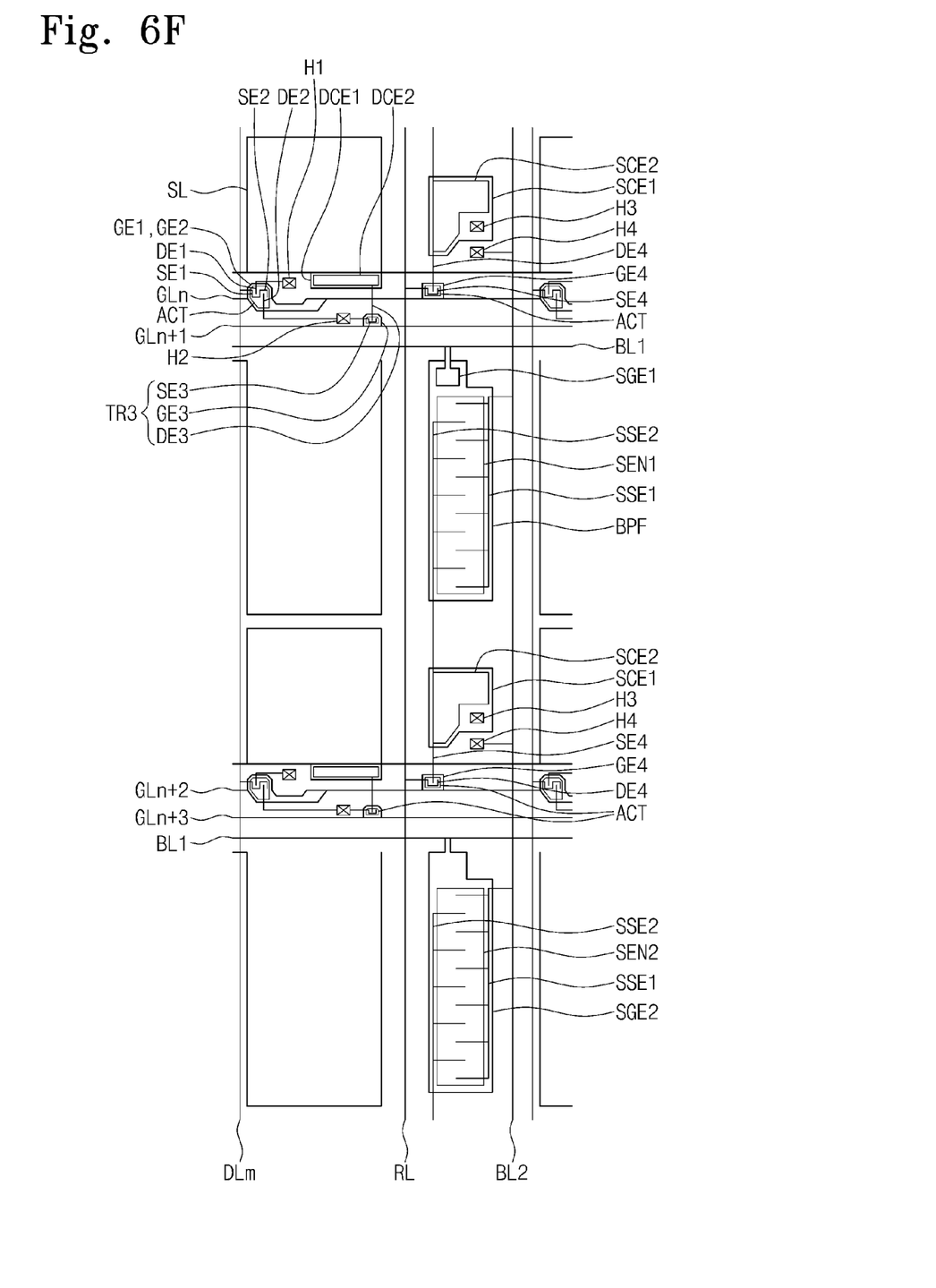

As shown in FIG. 6F, the second insulating layer 126 is formed on the second base substrate 121 to cover the first, second, and third transistors TR1, TR2, and TR3 and the second charging electrode SCE2. The second insulating layer 126 is formed of an inorganic material, such as silicon nitride (SiNx).

The second insulating layer 126 is provided with the first and second contact holes H1 and H2 formed therethrough to respectively connect the first and second pixel electrodes PE1 and PE2 to the first and second drain electrodes DE1 and DE2. The first contact hole H1 is disposed on the first drain electrode DE1 and the second contact hole H2 is disposed on the second drain electrode DE2.

In addition, the second insulating layer 126 is provided with the third contact hole H3 to expose the portion of the first charging electrode SCE1 and the fourth contact hole H4 to expose the portion of the second bias line BL2. The third contact hole H3 is formed through not only the second insulating layer 126 but also the first insulating layer 123 to expose the portion of the first charging electrode SCE1.

Figure 6G:
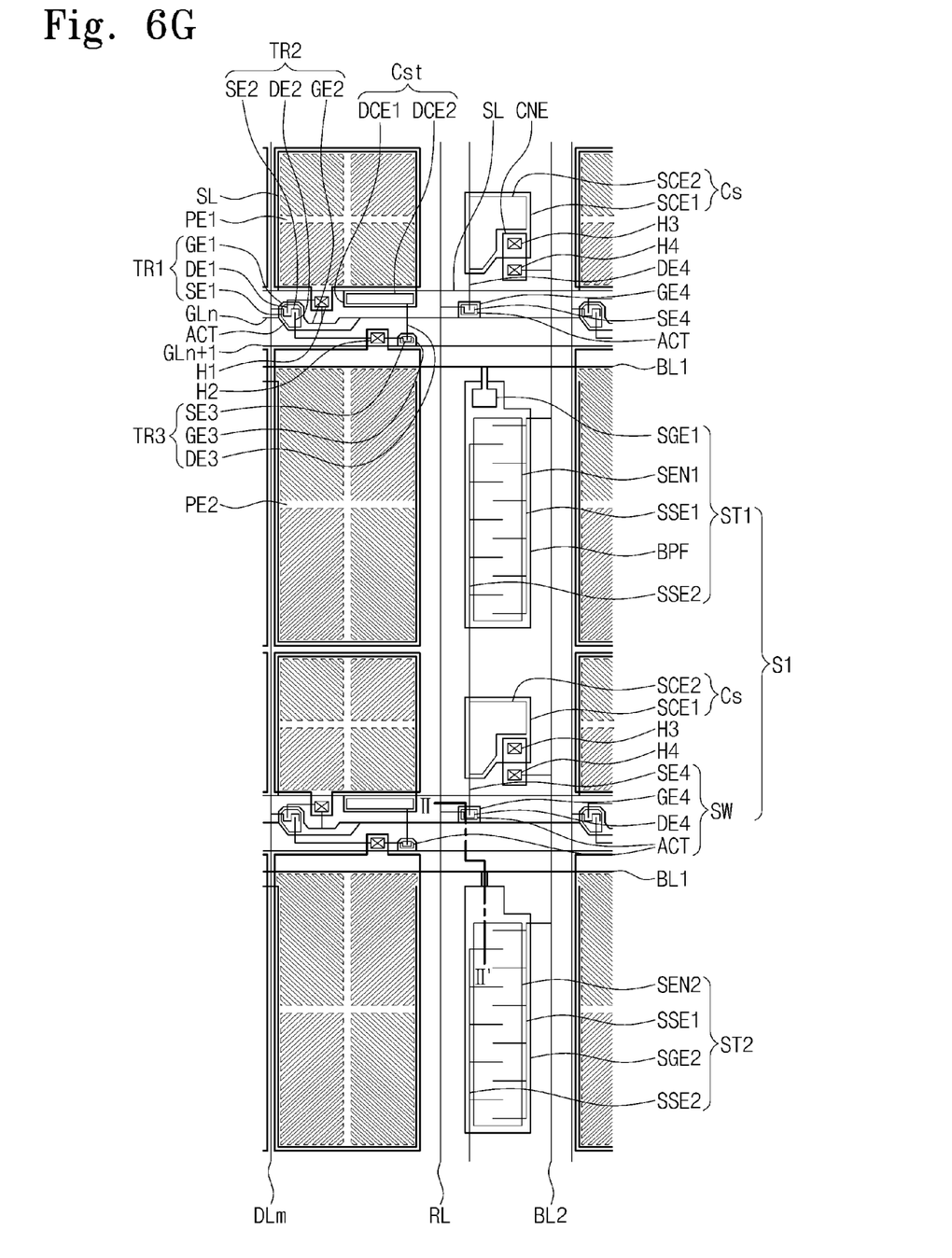

Referring to FIG. 6G, the transparent conductive layer is formed on the second insulating layer 126 using indium tin oxide or indium zinc oxide. Then, the transparent conductive layer is patterned to form the first pixel electrode PE1, the second pixel electrode PE2, and the connection electrode CNE.

The first pixel electrode PE1 is electrically connected to the first drain electrode DE1 through the first contact hole H1 and the second pixel electrode PE2 is electrically connected to the second drain electrode DE2 through the second contact hole H2. In addition, the connection electrode CNE connects the first charging electrode SCE1 and the second bias line BL2 through the third and fourth contact holes H3 and H4.

Although not shown in figures, the color filter is formed on the first base substrate 111 to correspond to the first and second pixel electrodes PE1 and PE2, and a light blocking member BM is formed on the first base substrate 111 to correspond to the first and second sensors. In addition, the common electrode CE is formed on the color filter and the light blocking member. The liquid crystal layer 130 is disposed between the first substrate 110 and the second substrate 120. The liquid crystal layer 130 may include vertically aligned liquid crystals.

According to the above, the pixel and the sensor may be formed by one single process. Thus, a manufacturing process time for the display apparatus may be reduced, thereby improving the productivity.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
    a display panel which receives a light and displays an image; and
    at least one light generating part which provides the light to the display panel,
    the display panel comprising:
        a first substrate;
        a second substrate disposed on the first substrate, the second substrate comprising a plurality of pixel units including:
            a sensor which senses the light generated from the light generating part and reflected from an object on the display panel, and
            a pixel; and
        a light blocking member in an area including the sensor, wherein the light blocking member prevents the light generated from the light generating part from being directly incident to the sensor.

2. The display apparatus of claim 1, wherein
    the pixel of the pixel units comprises a plurality of sub-pixels arranged in a first direction, and
    the sensor of the pixel units is adjacent to a side of the pixel in the first direction.

3. The display apparatus of claim 2, wherein
    one of the pixel units includes a first sensor, and
    a pixel unit adjacent to the one pixel unit including the first sensor, includes a second sensor.

4. The display apparatus of claim 3, wherein the pixel unit including the second sensor is adjacent to the pixel unit including the first sensor in a second direction substantially perpendicular to the first direction.

5. The display apparatus of claim 3, wherein
    the second substrate further comprises a gate line, a data line, and a readout line,
    each of the pixels comprises at least one driving transistor which is connected to the gate line, and
    each of the first and second sensors comprises:
        a sensing transistor which senses the light and outputs a sensing signal based on the light, and
        a switching transistor which is connected to the gate line and applies the sensing signal to the readout line.

6. The display apparatus of claim 5, wherein the sensing transistor comprises:
    a sensor gate electrode which receives a first bias voltage;
    a sensor layer;
    a first sensing electrode on the sensor layer; and
    a second sensing electrode on the sensor layer and spaced apart from the first sensing electrode.

7. The display apparatus of claim 6, wherein the first sensor further comprises:
    a filter which overlaps the sensor gate electrode and transmits a light having an infrared ray wavelength and blocks a light having a wavelength except for the infrared ray wavelength, the sensor layer overlaps the filter, and the filter receives the first bias voltage from the sensor gate electrode.

8. The display apparatus of claim 7, wherein the sensor layer of the second sensor overlaps the sensor gate electrode of the second sensor.

9. The display apparatus of claim 6, wherein each of the driving transistor and the switching transistor comprises:
a gate electrode connected to the gate line;
a semiconductor layer on the gate electrode;
a source electrode on the semiconductor layer; and
a drain electrode on the semiconductor layer and spaced apart from the source electrode.

10. The display apparatus of claim 9, wherein the semiconductor layer of the switching transistor is in a same layer and includes a same material as the sensor layer of the first sensor.

11. The display apparatus of claim 5, wherein the readout line is substantially parallel to the data line when viewed in a plan view and in a same layer as the data line.

12. The display apparatus of claim 1, wherein the light blocking member is on the first substrate and overlaps with the sensor of the second substrate.

13. The display apparatus of claim 1, wherein the light blocking member has a light transmittance of about 5%.

14. A method of manufacturing a display apparatus, the method comprising:
forming a second substrate including a second base substrate which includes a plurality of pixel unit areas including a pixel area and a sensor area;
forming a first substrate including a first base substrate and a common electrode;
disposing a light generating part to provide light to the first substrate; and
interposing a liquid crystal layer between the first substrate and the second substrate,
wherein
the forming the second substrate comprises respectively forming a pixel and a light sensor in the pixel area and the sensor area, in each of the pixel unit areas, and
the forming of the first substrate comprises forming a light blocking member which overlaps the light sensor in the sensor area and blocks the light provided from the light generating part from being directly incident to the light sensor.

15. The method of claim 14, wherein the forming the pixel and the sensor comprises:
forming a first gate electrode in each pixel area;
forming a second gate electrode and a sensor gate electrode in each sensor area;
forming a first insulating layer which overlaps the first and second gate electrodes and the second base substrate;
forming a semiconductor layer on the first and second gate electrodes;
forming a sensor layer;
forming a source electrode and a drain electrode on the semiconductor layer, and a first sensing electrode and a second sensing electrode on the sensor layer;
forming a second insulating layer which covers the source electrode, the drain electrode, and the first and second sensing electrodes;
forming a first contact hole which exposes a portion of the drain electrode; and
forming a pixel electrode which is connected to the drain electrode through the first contact hole.

16. The method of claim 15,
further comprising forming a filter layer in each sensor area of the second base substrate, wherein the filter layer transmits a light having a specific wavelength and blocks the light having a remaining wavelength except for the specific wavelength,
wherein the forming of the sensor gate electrode comprises forming a first sensor gate electrode on the filter layer, and forming a second sensor gate electrode on the second base substrate.

17. The method of claim 16, wherein
the sensor layer comprises a first sensor layer formed on the filter, and a second sensor layer formed on the second sensor gate electrode, and
the first sensor layer is formed by a same process as the semiconductor layer.

18. The method of claim 17, wherein the second sensor layer is formed of a material different from the first sensor layer.

19. The method of claim 15, wherein
the forming the first and second gate electrodes comprises forming a gate line on the first base substrate and extended in a predetermined direction, and
the first and second gate electrodes are electrically connected to the gate line.

20. The method of claim 15, wherein
the pixel of the pixel units comprises a plurality of sub-pixels arranged in a first direction, and
the sensor is disposed adjacent to a side of the pixel in the first direction.

21. The method of claim 20, wherein
one of the pixel units comprises a first sensor,
a pixel unit disposed adjacent to the one pixel unit including the first sensor, comprises a second sensor,
the pixel unit including the second sensor is disposed adjacent to the pixel unit including the first sensor in a second direction substantially perpendicular to the first direction.

* * * * *